VAPOR POLISHING TECHNIQUE

Filed Nov. 17, 1965

INVENTORS
HORST R. LEONHARDT
ARNOLD REISMAN
BY
Thomas J. Kilgannon Jr.
ATTORNEY

United States Patent Office 3,480,491

Patented Nov. 25, 1969

3,480,491

VAPOR POLISHING TECHNIQUE

Arnold Reisman, Yorktown Heights, and Horst R. Leonhardt, Ossining, N.Y., assignors to International Business Machines Corporation, Armonk, N.Y., a corporation of New York Filed Nov. 17, 1965, Ser. No. 508,313
Int. Cl. H01l 7/00
U.S. Cl. 156—17 14 Claims

ABSTRACT OF THE DISCLOSURE

A method of polishing semiconductor compounds selected from elements of Group III and Group IV of the Periodic Table such as gallium arsenide is disclosed. The method includes the step of reacting the semiconductor of a substrate with a hydrogen halide at a temperature sufficient to polish a semiconductor and at a gas pressure of an element selected from the Group V elements of the Periodic Table sufficient to prevent dissociation of the semiconductor compound.

One of the major considerations in any epitaxial growth system, is the ability to provide smooth, polished substrates upon which epitaxial deposits may be grown. In epitaxial growth processes, the crystalline structure of the deposited material is governed by the crystalline structure of the substrate upon which deposition takes place. Thus, imperfections in the crystal structure or damage due to mechanical sawing and lapping or simply handling in the atmosphere are likely to be reproduced in the epitaxially deposited material rendering the resulting deposition less useful. The condition of the substrate is, therefore, a critical factor in epitaxial growth and, as a result, a great deal of effort has been put forth to provide techniques for polishing semiconductor materials such as silicon, germanium and gallium arsenide.

In certain prior art vapor polishing techniques, the conditions for polishing are attained by adjusting conditions (in apparatus designed for deposition) at a seed site such that the seed material is etched smoothly rather than deposited upon, providing a surface upon which semiconductor material may be subsequently epitaxially deposited. Such systems are relatively sensitive to temperature, flow rates and to the maintenance of vapor phase conditions such that constituents of the substrate crystal are removed rather than deposited.

Other prior art techniques incorporate combinations of mechanical and chemical polishing but, in many instances, such processing is ineffective in removing microscopic imperfections (e.g. thin oxide layers) which ultimately may affect the subsequently deposited layer. Also, the results in many polishing techniques appear to be affected by the crystallographic orientation of the substrate crystals so that, although polishing is attained on one or more orientations, polishing may not be attained on other crystallographic orientations. Finally, a method of polishing which applies to one semiconductor may not be applicable to another semiconductor particularly where vapor polishing is involved.

At this juncture, a distinction should be made between the terms etching and polishing. In the vapor polishing environment, these terms may best be distinguished in terms of the character of the surface produced. Thus, the term polishing may be applied to a technique or method of material removal which produces a smooth, unmarred, pit free surface. The term etching may be applied to a technique or method of material removal which produces a rough, pitted surface. In polishing, one may begin with a rough, pitted surface but, after processing, the resulting surface is smooth and unpitted. In etching, the starting material whether polished or rough and pitted, after processing will be rough and pitted.

While etching may be attained with relative ease using a wide variety of conditions, polishing, if it is attainable at all with a given etchant, as will be shown in what follows, only occurs under special conditions.

It is, therefore, an object of this invention to provide an improved method for polishing semiconductor compounds selected from elements of Group III and Group V of the Periodic Table.

Another object is to provide a method for polishing semiconductor compounds selected from elements of Group III and Group V of the Periodic Table which produces substrates which are amenable to subsequent epitaxial deposition.

Another object is to provide a method for polishing semiconductor compounds selected from elements of Group III and Group V of the Periodic Table which is simple and easily controlled.

Still another object is to provide a method for in situ vapor polishing which does not require the removal of the polished substrates from the polishing apparatus for subsequent epitaxial deposition and doping.

Yet an other object is to provide a method for vapor polishing Group III–V semiconductor compound wafers which yields smooth, planar surfaces.

In accordance with the present invention, a semiconductor wafer selected from the group of compounds, comprised of a Group III and a Group V element of the Periodic Table is provided with a smooth, planar, polished surface by reacting the semiconductor material of the substrate with a hydrogen-hydrogen halide mixture at a temperature sufficient to polish the wafers and at a gas pressure of an element selected from Group V of the Periodic Table sufficient to suppress the dissociation of the semiconductor compound. The semiconductor substrates resulting from this method are suitable for subsequent epitaxial deposition of germanium or other semiconductor material because of the smoothness and planarity of the resulting surfaces. The surfaces are free from contamination, and deposition can be accomplished without removal from the polishing site by simply introducing deposition species in vapor form into the polishing site at a temperature suitable for deposition. The polishing method of this invention is simple, fast, economical and reproducible, and is superior to other proposed methods in that it requires no rigid control of temperature, flow rates or amount of constituents in the vapor phase.

In accordance with a more particular aspect of the present invention a gallium arsenide wafer is provided in the smooth, planar, polished surface by reacting the gallium arsenide substrate with a hydrogen-hydrogen halide mixture at a temperature sufficient to polish the wafers and at an arsenic pressure sufficient to suppress the dissociation of the gallium arsenide. In the instance where gallium arsenide is used as the substrate, gallium and arsenic are removed from the substrate in a 1:1 ratio, the amount of gallium entering the vapor phase being controlled simply by the amount of hydrogen iodide introduced at the polishing site.

The foregoing and other objects, features and advantages, of the invention will be apparent from the following more particular description of a preferred embodiment of the invention, as illustrated in the accompanying drawing.

Figure 1:
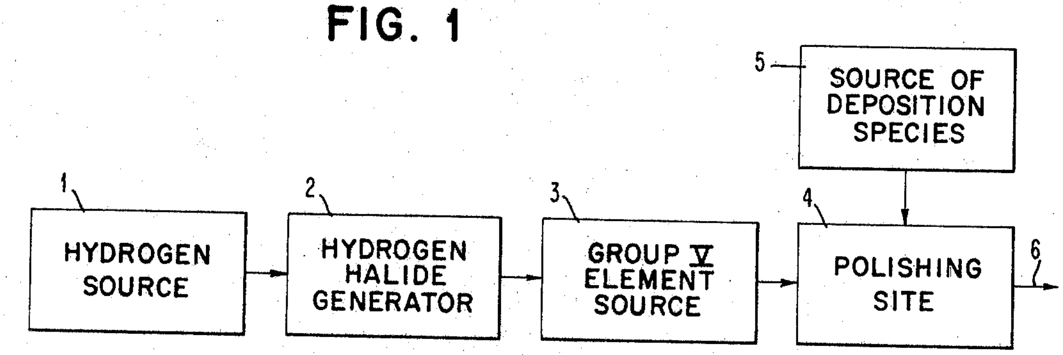
FIG. 1 is a block diagram of apparatus which may be utilized to polish the semiconductor compound substrates in accordance with the method of the invention.

Referring now to FIG. 1, there is shown a block diagram of apparatus which may be utilized in practicing the method of the invention. A source of hydrogen 1, which acts as a carrier gas, feeds a hydrogen halide generator 2. In the preferred method of this invention, the hydrogen halide is hydrogen iodide, but other halides could be used equally well. It is appreciated that conditions using other halides will be somewhat different with respect to the temperatures at which polishing takes place, but there is no reason to believe that polishing will not occur at appropriate temperatures and gaseous Group V element pressures. Hydrogen halide generator 2 consists of a heated source of iodine which provides a hydrogen-iodine mixture in vapor form. The hydrogen iodine mixture is then passed through a heated platinum bed forming the desired hydrogen iodide compound. A detailed description of such an in situ hydrogen iodide generator could be found in the Journal of the Electrochemical Society, vol. 112, No. 3, March 1965, page 315 by A. Reisman and M. Berkenblit entitled "Substrate Orientation Effects and Germanium Epitaxy in an Open Tube HI Transport System." After the hydrogen iodide is formed, it is transported by the hydrogen gas to an elemental source 3 of Group V materials, which is heated by any suitable means to a temperature sufficient to provide a desired Group V element pressure in the system. The desired Group V gas pressure is that pressure which will prevent the dissociation of the semiconductor compound when the compound is heated to a temperature to attain polishing.

Group V elements such as arsenic, phosphorous and antimony may be utilized in conjunction with III–V compounds such as the arsenides, phosphides and antimonides of gallium and indium. To obtain polishing of a semiconductor compound such as gallium arsenide, where gallium is characterized as the cation and arsenic is characterized as the anion of the compound, the Group V element chosen to provide the desired gas pressure must be the same as the anion of the compound. Thus, where gallium arsenide is the semiconductor compound, arsenic is used to provide the desired gas pressure. For indium antimonide, antimony is used and for gallium phosphide, phosphorus is used.

The method of this invention will be described hereinafter using gallium arsenide as the III–V semiconductor or compound which is to be polished; it being appreciated that the other semiconductor compounds mentioned hereinabove could be processed in substantially the same manner without departing from the spirit of this invention:

Returning now to FIG. 1, the hydrogen from source 1, the hydrogen iodide vapor from generator 2 and the arsenic vapor from source 3 are carried to a polishing site 4 which is heated by any appropriate means to a temperature which is sufficient to polish the gallium arsenide semiconductor substrates which are disposed within polishing site 4. At the temperatures utilized for polishing, 1000° C. to a temperature just below the melting point of gallium arsenide (1240° C.), the gallium arsenide would dissociate and arsenic alone would be removed from the gallium arsenide substrate leaving a layer of substantially pure gallium on the surface of the substrate. The dissociation of the gallium arsenide is prevented by maintaining an excess arsenic pressure at polishing site 4. Thus, for a 1000° C. temperature at polishing site 4, an arsenic pressure of 15 torr is used, and for temperatures of 1100° C. and 1200° C., arsenic pressures of 60 torr and 300 torr, respectively are used.

In FIG. 1, polishing site 4 may be converted to a deposition site by simply connecting site 4 to a source 5 of deposition material which may be a source of germanium, gallium arsenide, or other semiconductor deposition species well known to those skilled in the epitaxial growth art. The polished substrates, by this means, need not be removed from their protected environment and deposition can be accomplished immediately after polishing. Reference numeral 6 indicates an output from the system to atmospheric pressure. Such a system is characterized as an open tube system; the sum of the partial pressures of the various species present being equal to atmospheric pressure.

Figure 2:
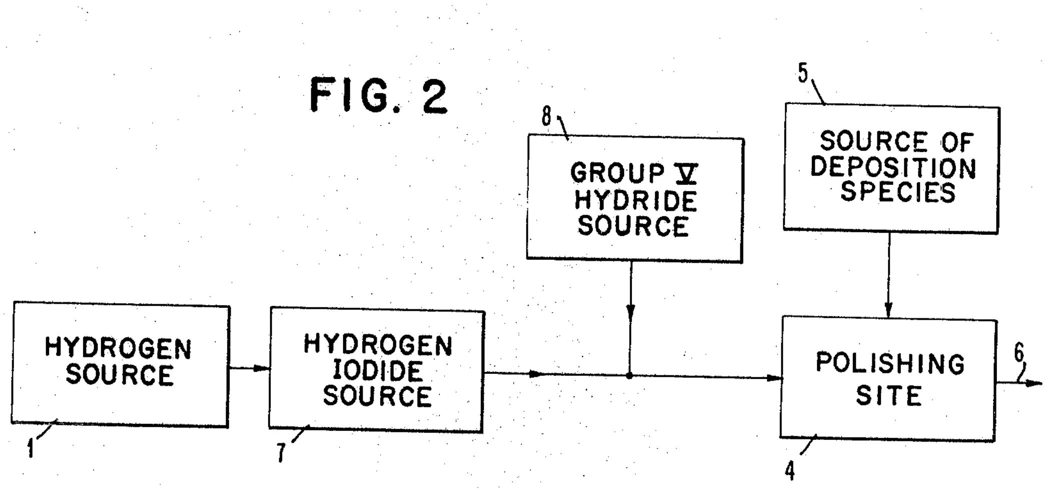
FIG. 2 is a block diagram of an alternative apparatus which utilizes a hydrogen, hydrogen-halide source and a gaseous hydride source to polish the III–V semiconductor substrates in accordance with the method of the invention.

Referring to FIGS. 1 and 2, hydrogen halide generator 2 may be replaced by a tank of hydrogen iodide which is commercially available and indicated by block 7 in FIG. 1, block 3 has been described as a source of solid arsenic or other Group V element but, a compound of arsenic, antimony or phosphorous which provides elemental arsenic, antimony or phosphorous upon decomposition, $AsH_3$, $SbH_3$ or $PH_3$ for example, could be utilized equally well. Block 8 in FIG. 2 indicates a Group V compound source. Hydrides of arsenic, antimony and phosphorous are commercially available under the names arsine, stibine and phosphine, respectively.

To provide an appropriate pressure of arsenic at 1000° C., a ratio of the flow rates of $H_2$ to $AsH_3$ of $r=10.9$ is used, and at 1100° C., the ratio is 1.33.

When the hydrogen iodide-hydrogen-arsenic mixture is introduced at polishing site 4, the hydrogen iodide and the gallium arsenide react to form the mono-iodide and the triiodide species of gallium along with arsenic in the vapor phase. The arsenic released into the vapor phase is added to the arsenic vapor already present and takes no part in the reaction other than to prevent the dissociation of the gallium arsenide substrates.

Vapor polishing of the type described hereinabove can be attained using gallium arsenide substrates which have been lapped or chemically polished prior to the vapor polishing step. It has been found, however, that undesirable edge rounding results when mechanically lapped gallium arsenide substrates are used. The use of chemically polished substrates eliminates the edge rounding because the time for vapor polishing can be kept short; so, where planar surfaces are desired, a chemical polishing prior to vapor polishing is recommended.

A chemical polishing technique which may be utilized is described in U.S. Patent 3,342,652 issued Sept. 9, 1967 entitled "Chemical Polishing of a Semiconductor Substrate" in the names of A. Reisman and R. L. Rohr and assigned to the same assignee as the present invention.

Experimental results have indicated that it is possible to vapor polish all substrates regardless of their crystallographic orientation. The minimum polishing temperature, however, appears to depend on the orientation. For example, a gallium arsenide substrate having a <111>A orientation can be polished at temperatures from 1100° C. to just below the melting point of gallium arsenide (1240° C.), but not below 1100° C. A gallium arsenide substrate having an orientation of <111>B, however, can be polished from a temperature of 1000° C. to just below the melting point of gallium arsenide. It should be appreciated that the temperatures chosen are critical in that polishing will not be attained at temperatures below the temperatures indicated even though etching which produces rough, pitted surfaces does take place at the lower temperatures.

The following crystallographic orientations are other examples of gallium arsenide substrate orientations which have been vapor polished at a temperature of 1100° C. and at an arsenic pressure of approximately 60 torr.

| | |
|---|---|
| | <211>A |
| | <211>B |
| | <100> |
| 16° off | <100>→<111>A |
| 16° off | <100>→<111>B |
| 12° off | <100>→<110> |
| 8° off | <100>→<110> |
| 4° off | <100>→<110> |
| 4° off | <100>→<111> |
| | <110> |
| 4° off | <110>→<100> |
| 4° off | <110>→<111> |

In carrying out the method of this invention, the pressure at which the hydrogen halide is introduced does not appear to be critical. The gas pressure of the Group V element, however, must be at least equal to the dissociation pressure of the III–V semiconductor compound at the temperature at the polishing site.

With respect to flow rates of the constituents used, it should be understood that the quality of the polish is not affected by flow rate. However, at lower flow rates, the system is more subject to variation in rates of removal of material from a substrate than at higher flow rates.

While the invention has been particularly shown and described with reference to a preferred embodiment thereof, it will be understood by those skilled in the art that various changes in form and details may be made therein without departing from the spirit and scope of the invention.

What is claimed is:

1. A method of vapor polishing a semiconductor compound substrate selected from the group consisting of elements of Group III and Group V elements of the Periodic Table comprising the step of reacting the semiconductor of said substrate with a hydrogen halide at a temperature sufficient to polish said semiconductor and at a gas pressure of an element selected from the Group V elements of the Periodic Table sufficient to prevent dissociation of said semiconductor compound at said polishing temperature.

2. A method according to claim 1 wherein said semiconductor compounds includes the arsenides, phosphides and antimonides of gallium and indium.

3. A method of vapor polishing gallium arsenide substrates comprising the step of reacting the gallium arsenide of said substrates with a hydrogen halide over a temperature range of 1000° C. to a temperature just below the melting point of gallium arsenide and over a range of gaseous arsenic pressures from 15 torr to 300 torr to prevent dissociation of said gallium arsenide.

4. A method of vapor polishing gallium arsenide substrates comprising the step of reacting the gallium arsenide of said substrate with a hydrogen halide over a temperature range of 1100° C. to 1200° C. and over a range of gaseous arsenic pressures sufficient to prevent dissociation of said gallium arsenide at said polishing temperature.

5. A method according to claim 4 wherein the range of arsenic pressures is 60 torr to 300 torr.

6. A method according to claim 4 wherein the hydrogen halide is hydrogen iodide.

7. A method of vapor polishing gallium arsenide comprising the steps of:

placing a substrate of gallium arsenide at a polishing site, introducing a mixture of hydrogen halide and a carrier gas to said site, providing an arsenic atmosphere at said site at a pressure sufficient to prevent dissociation of said gallium arsenide at said polishing temperature, and heating said substrate to a temperature sufficient to polish a surface of said substrate.

8. A method according to claim 7 wherein the step of heating said substrate includes the step of heating said substrate to a temperature of at least 1000° C.

9. A method according to claim 7 wherein the step of heating said substrate includes the step of heating said substrate over a temperature range of 1000° C. to a temperature just below the melting point of said gallium arsenide.

10. A method according to claim 7 wherein the step of heating said substrate includes the step of heating said substrate over a temperature range of 1100° C. to 1200° C.

11. A method according to claim 7 wherein said hydrogen halide is hydrogen iodide.

12. A method according to claim 7 wherein the step of providing an arsenic atmosphere includes the step of separately heating elemental arsenic at a point apart from said polishing site to a temperature sufficient to produce a gaseous arsenic pressure sufficient to prevent dissociation of said gallium arsenide at said polishing site.

13. A method according to claim 7 wherein the step of providing an arsenic atmosphere includes the step of introducing arsenic in the form of a gaseous hydride in an amount sufficient to produce a gaseous arsenic pressure sufficient to prevent dissociation of said gallium arsenide at said polishing site.

14. A method according to claim 7 wherein the pressure sufficient to prevent dissociation of said gallium arsenide is 60 torr to 300 torr.

References Cited

UNITED STATES PATENTS 3,393,103 7/1968 Hellbardt et al. ______ 148—175

JACOB H. STEINBERG, Primary Examiner

U.S. Cl. X.R.

148—175